United States Patent
Srivatsa et al.

(10) Patent No.: US 12,081,385 B2
(45) Date of Patent: Sep. 3, 2024

(54) TOPOLOGY-HOMOGENEITY FOR ENRICHING EVENT PATTERNS IN ARTIFICIAL INTELLIGENCE OPERATIONS

(71) Applicant: INTERNATIONAL BUSINESS MACHINES CORPORATION, Armonk, NY (US)

(72) Inventors: Mudhakar Srivatsa, White Plains, NY (US); Jonathan Ian Settle, Dursley (GB); Satishkumar Sadagopan, Leawood, KS (US); Mathews Thomas, Flower Mound, TX (US); Utpal Mangla, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/046,900

(22) Filed: Oct. 14, 2022

(65) Prior Publication Data
US 2024/0129178 A1    Apr. 18, 2024

(51) Int. Cl.
*H04L 41/0631* (2022.01)
*H04L 41/0604* (2022.01)
*H04L 41/12* (2022.01)

(52) U.S. Cl.
CPC ...... *H04L 41/0631* (2013.01); *H04L 41/0627* (2013.01); *H04L 41/12* (2013.01)

(58) Field of Classification Search
CPC .................................................. H04L 41/12
See application file for complete search history.

(56) References Cited

U.S. PATENT DOCUMENTS

| | | | |
|---|---|---|---|
| 9,998,562 B1* | 6/2018 | Peterson | H04L 67/60 |
| 10,148,677 B2 | 12/2018 | Muddu et al. | |
| 10,700,919 B2 | 6/2020 | Tee | |
| 2007/0061663 A1* | 3/2007 | Loyd | H04L 41/0631 714/746 |
| 2009/0262650 A1* | 10/2009 | Shaikh | H04L 41/0631 370/242 |
| 2013/0212257 A1* | 8/2013 | Murase | H04L 41/0631 709/224 |

(Continued)

OTHER PUBLICATIONS

Disclosed Anonymously, "System and Method for Preemptive Auto-Deployment Of Application Servers 'Nodes' Based on Activity Streams Link Data"; IP.com No. IPCOM000223681D (2012); 4 pgs.

(Continued)

*Primary Examiner* — Philip J Chea
*Assistant Examiner* — James Ross Hollister
(74) *Attorney, Agent, or Firm* — Intelletek Law Group, PLLC; Gabriel Daniel, Esq.

(57) ABSTRACT

A method for determining a correlation of one or more events occurring in a plurality of nodes of a network includes accessing, by a computing device, address information associated with each of the plurality of nodes on the network. The computing device can further access one or more event IDs associated with one or more events occurring on the plurality of nodes. The computing device can further create an association the one or more events occurring on the plurality of nodes with related events occurring on others of the plurality of nodes, the association including the address information.

20 Claims, 3 Drawing Sheets

(56) References Cited

U.S. PATENT DOCUMENTS

| | | | | |
|---|---|---|---|---|
| 2015/0221109 A1* | 8/2015 | Klein | ...................... | H04L 41/12 |
| | | | | 345/440 |
| 2021/0281469 A1 | 9/2021 | Tee et al. | | |
| 2022/0318082 A1* | 10/2022 | Slinger | ............... | G06F 11/2263 |
| 2023/0095270 A1* | 3/2023 | Garapati | ................ | G06N 5/022 |
| | | | | 714/37 |

OTHER PUBLICATIONS

Disclosed Anonymously, "Brain-Inspired Inhomogeneous Pathways and Learning-Free Adaptive Neural Nodes"; IP.com No. IPCOM000261357D (2020); 8 pgs.

Disclosed Anonymously, "System and Method for Real-Time Notification to Farmers and Concerned Authorities about Local Events that may Harm Harvest and Remediation using Edge Analytics and Machine Learning in 5G Networks"; IP.com No. IPCOM000267302D (2021); 10 pgs.

Fournier-Viger, P. et al., "Discovering Alarm Correlation Rules for Network Fault Management"; AIOPS (2020); 12 pgs.

* cited by examiner

TOPOLOGY-HOMOGENEITY FOR ENRICHING EVENT PATTERNS IN ARTIFICIAL INTELLIGENCE OPERATIONS

BACKGROUND

Technical Field

The present disclosure generally relates to machine learning analytics technology, and more particularly, to machine learning analytics technology, such as artificial intelligence (AI) for information technology (IT) operations (AIOps) that enhances IT operations analytics.

Description of the Related Art

Alert correlation is a method of grouping alerts into one high-level incident. This allows IT professionals to better understand the relationships between alerts from multiple sources that occur within the IT environment, eliminate wasted/duplicate efforts by different teams on the different alerts that are part of the same incident, and determine which ones are most relevant, important and that should be investigated.

Alert correlation is a well-studied problem in telecommunication (Telco) AIOps. Across multiple Telco edges (e.g., virtualized radio access networks (vRANs)) the ability to succinctly perform alert event correlation is a challenging problem. Conventional approaches have used association rule mining to learn co-occurrence patterns in alert events. Association rule mining can identify co-occurrence patterns on, for example, simple network management protocol (SNMP) trap IDs. Coincidental occurrence of trap IDs in a first event set may be flagged as a match even though they might have occurred on unrelated nodes.

One conventional solution is to learn co-occurrence patterns on (entity ID, trap ID) tuples. This approach can reduce false positive rate, but can soon run into sparsity of data. Further, the rules learnt at one network (e.g., a vRAN in Kansas) does not apply to another network (e.g., a vRAN operated by the same Telco in New York) since the rules are bound to specific IP addresses. In essence, the rules learnt on trap IDs alone are transferrable, but those learnt on (entity ID, trap ID) are non-transferrable across two networks.

Presently, there are no robust methods for performing alert event correlation.

SUMMARY

In one embodiment, a method for determining a correlation of one or more events occurring in a plurality of network nodes of a network includes accessing, by a computing device, address information associated with each of the plurality of nodes on the network. The computing device can further access one or more event IDs associated with one or more events occurring on the plurality of nodes. The computing device can further create an association the one or more events occurring on the plurality of nodes with related events occurring on others of the plurality of nodes, the association including the address information.

In an embodiment, which may be combined with the preceding embodiments the network is a telecommunications network.

In an embodiment, which may be combined with the preceding embodiments, the events are artificial intelligence operation events.

In an embodiment, which may be combined with the preceding embodiments the method further includes training the computing device with training data to establish a correlation between the events and the plurality of nodes as well as a topological relationship between the nodes.

In an embodiment, which may be combined with the preceding embodiments, the method further includes calculating a probability distribution of the correlation between the events and the plurality of nodes between each of the topological relationships.

In an embodiment, which may be combined with the preceding embodiments the method further includes determining an entropy of the probability distribution and flagging the correlations that have an entropy above a predetermined threshold as being spurious.

In an embodiment, which may be combined with the preceding embodiments, the method further includes capturing a topological relationship between the plurality of nodes.

In an embodiment, which may be combined with the preceding embodiments, the topological relationship includes one of border gateway protocol peers, open shortest path first neighbors, virtual private network tunnel, or shared virtual extensible local area network.

In an embodiment, which may be combined with the preceding embodiments, the method further includes calculating a log likelihood score of the correlation between the events and the plurality of nodes between each of the topological relationships.

In an embodiment, which may be combined with the preceding embodiments, the method further includes flagging the correlations that have the log likelihood score below a predetermined threshold as being spurious.

In one embodiment, a method for determining a correlation of one or more events, in a telecommunication artificial intelligence operation, occurring in a plurality of network nodes of a network includes accessing, by a computing device, address information associated with each of the plurality of nodes on the network. The computing device can access one or more event IDs associated with one or more events occurring on the plurality of nodes and can create an association between the one or more events occurring on the plurality of nodes with related events occurring on others of the plurality of nodes, the association including the address information. The computing device can capture a topological relationship between the plurality of nodes and calculate a log likelihood score of the correlation between the events and the plurality of nodes between each of the topological relationships.

By virtue of the concepts discussed herein, methods for alert correlation are provided that provides a topology homogeneity score to reduce the false positive rate of the event-id based approach, while avoiding data sparsity challenges, requiring the learning of a compact set of rules, and (iv) ensuring transferability of rules.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Conventional approaches have used association rule mining to learn co-occurrence patterns in alert events. For example, given a collection of simple network management protocol (SNMP) trap IDs are shown below (equally applicable to other alert event IDs or log template IDs).

| Trap ID | Description |
|---|---|
| 28 | bsnIpsecEspAuthFailureTrap |
| 79 | bsnAPRegulatoryDomainMismatch |
| 102 | bsnAPBigNavDosAttack |
| 104 | bsnAPContainedAsARogue |
| 124 | bsnAPIfDown |
| 130 | bsnAPInterferenceProfileFailed |
| 230 | bsnTemperatureSensorFailure |
| 378 | csiErrorTrap |

Association rule mining can identify co-occurrence patterns on SNMP trap IDs as shown in the table below:

| Trap ID set | Support |
|---|---|
| 124, 230 | 0.86 |
| 124, 230, 378 | 0.78 |
| 103, 378, 230 | 0.75 |
| 104, 230, 378, 102 | 0.61 |

Unfortunately, the above rules can result in high false positive rates since they do not capture the entity at which these events occur. Hence, coincidental occurrence of trap IDs (124, 230) in the first event set are flagged as a match even though they might have occurred on unrelated nodes.

One conventional solution is to learn co-occurrence patterns on (entity ID, trap ID) tuples as shown below:

| (IP Address, Trap ID) | Support |
|---|---|
| (x.y.11.3, 124), (x.y.1.10, 124) | 0.97 |
| (x.y.8.29, 124) (x.y.9.163, 230) | 0.96 |
| (x.y.8.29, 124) (x.y.9.163, 230) (x.y.15.1, 378) | 0.88 |
| (x.y.9.33, 103) (x.y.15.1, 378) (x.y.1.10, 230) | 0.85 |
| (x.y.9.163, 104) (x.y.9.163, 230) | 0.71 |
| (x.y.15.1, 378) (x.y.107.1, 102) | |

This approach indeed reduces false positive rate but can soon run into sparsity of data, i.e., there should be sufficient observations on a given set of entities (e.g., x.y.11.3 and x.y.1.10 in the first event set) or learn duplicated rules on the same set of trap IDs across multiple sets of entity IDs. Second, the rules learnt at one network (e.g., a vRAN in Kansas) does not apply to another network (e.g., a vRAN operated by the same Telco in New York) since the rules are bound to specific IP addresses. In essence, the rules learnt on trap IDs alone are transferrable, but those learnt on (entity ID, trap ID) are non-transferrable across two networks.

Accordingly, embodiments of the present disclosure provide methods to simultaneously achieve the following: (i) low false positive rates (compared to an event ID only approach), (ii) avoid data sparsity challenges (faced when using an (entity ID, trap ID) based approach), (iii) learn a compact set of rules (which could be problematic when using a (entity ID, trap ID) based approach) and (iv) ensure transferability of rules (which could be problematic when using a (entity ID, trap ID) based approach).

The use of an event-id based approach, as discussed above, satisfies (ii), (iii) and (iv). The present disclosure presents a topology homogeneity score to reduce the false positive rate in the event-id based approach, while ensuring that (ii), (iii) and (iv) are preserved. In essence embodiments of the present disclosure simultaneously meet the objectives (i)-(iv) above.

According to aspects of the present disclosure, a topology homogeneity score can be computed on an association rule learnt on trap IDs (event IDs) as follows. Given an association rule $\{e_1,e_2,e_3\}$ (say $e_1$, $e_2$ and $e_3$ are trap IDs), and one matching instance of the rule $\{(e_1,a),(e_2,b),(e_3,c)\}$—where $e_1$ occurs on node a, $e_2$ occurs on node b and $e_3$ occurs on node c, we capture the topological relationship between the nodes $R_{ab}$, $R_{bc}$, $R_{ca}$ (e.g., Border Gateway Protocol (BGP) peers, Open Shortest Path First (OSPF) neighbors, Virtual Private Network (VPN) tunnel, or share Virtual Extensible LAN (VXLAN)). Given multiple matching instances of the association rule on a training dataset, the methods of the present disclosure can augment the rule with probability distributions over topological relationships between event pairs. For example, on the association rule if one observes $R_{ab}$=BGP peer on 9 matching instances and OSPF neighbor on 1 matching instance, then the probability distribution on $R_{ab}$ as $f_{Rab}$={BGP_Peer: 0.9, OSPG_Neighbor: 0.1}.

It would be expected that the discovered probability distributions are simple (low entropy). For example, the probability distribution on $f_{Rab}$={BGP_Peer: 0.9, OSPG$_{Neighbor}$: 0.1} has lower entropy of $-\log_2(0.9)-\log_2(0.1)=0.47$ (nearly deterministic) when compared to the probability distribution on $f_{Rab}$={BGP$_{peer}$: 0.5, OSPG_Neighbor: 0.5} which has higher entropy of $-\log_2(0.5)-\log_2(0.5)=1.0$ (highly non-deterministic). During training phase, association rules that have high entropy on pair-wise node relations can be flagged for being potentially spurious.

During the online phase, upon identifying a matching association rule, the topological relationship can be compared using a simple log likelihood measure. For example, upon matching an association rule, one can identify that $R_{ab}=\{\text{OSPF\_Neighbor}\}$ and, from the training dataset, the distribution of $R_{ab}$ is {BGP_Peer: 0.9, OSPG_Neighbor: 0.1}, then the log likelihood score is $\log_2(0.1)=-3.32$; on the other hand, if the identified $R_{ab}=\{\text{BGP\_Peer}\}$ then the log likelihood score is $\log_2(0.9)=-0.15$. The greater the value of the log likelihood score, the higher the confidence in the match.

In general, given an association rule $\{e_1, \ldots, e_n\}$ during the training phase, the probability distribution $f_{R_{ij}}$ for $R_{ij}$ is learnt over all pairs of matching entities ($1 \le i < j \le n$). Entropy of an association rule is determined as the average entropy over all $R_{ij}$:

$$\frac{\sum_{ij} \text{entropy}(f_{Rij})}{n*(n-1)/2}.$$

Rules with high entropy can be flagged as spurious. It should be understood that other features, other than entropy, can be determined. For example, a Euclidian distance can be calculated to determine if the rule should be flagged as spurious.

In the online matching phase, given a matching instance of an association rule $\{e_1, \ldots, e_n\}$, the average log likelihood is computed using the observed $R_{ij}$ s and $f_{Rij}$ (from training):

$$\sum_{ij} \frac{\log_2 f_{Rij}(\text{observed } R_{ij})}{n*(n-1)/2}.$$

Matches with higher log likelihood scores are considered high confidence matches.

Figure 1:
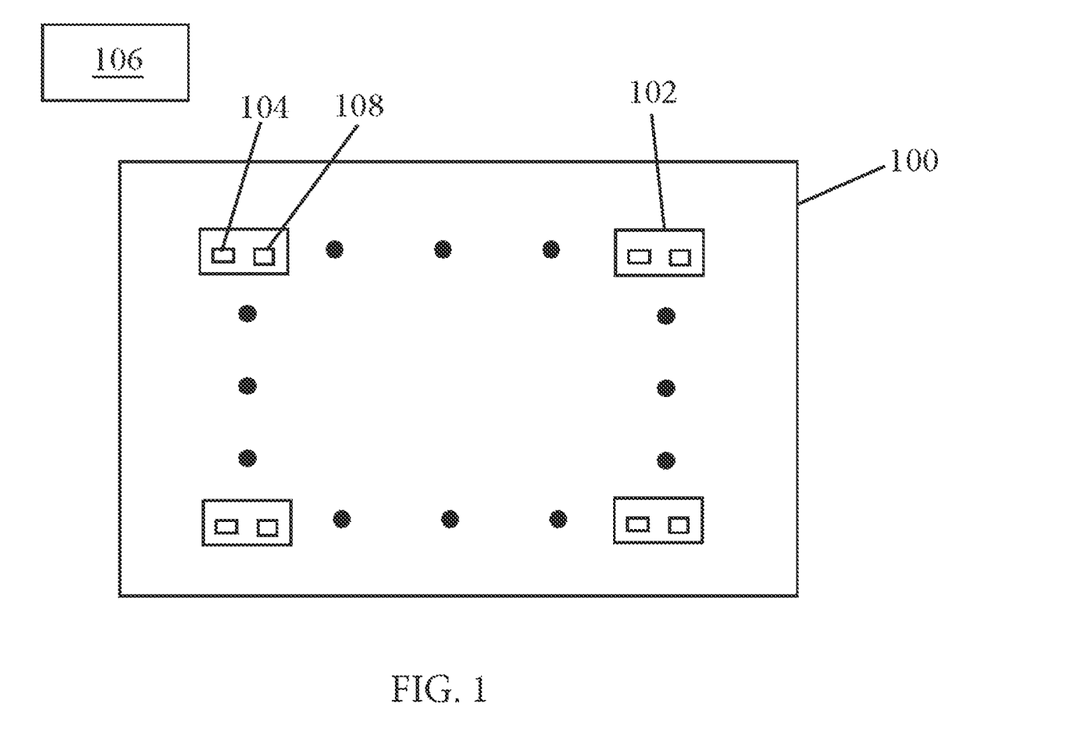
FIG. 1 is a schematic representation of a computing device in communication with a plurality of nodes of a network, according to an illustrative embodiment.

Referring to FIG. 1, a network 100 is illustrated as having a plurality of nodes 102. The network 100 may be, for example, a telecommunication (telco) network. Each of the nodes 102 can include address information 104 that may be accessed by a computing device 106. As illustrated, the computing device 106 may be remote of the network 100 or may even reside within the network. The computing device 106 may communicate with the nodes 102 by means known in the art. The computing device 106 can access event ID information 108 of each of the nodes 102. The computing device 106 can be configured to perform functions of the present disclosure, including, for example, associating event ID information 108 on one or more of the nodes 102 with similar event ID information 108 on others of the one or more modes 102. With the address information 104, the computing device 106 can determine a correlation of events between the network nodes 102.

The methods of the present disclosure meet requirements (i)-(iv), identified above, since rules are not bound to specific entity IDs, but associated with topological relations that are transferrable across two or more network instances. Hence, the methods of the present disclosure can improve the false positive rate as compared to the association method discussed above, while keeping rules compact and transferrable, while further avoiding the data sparsity issues.

Accordingly, one or more of the methodologies discussed herein may obviate a need for time consuming data processing by the user and the requirement to use methods discussed above which may result in false positives or may require extensive resources. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Evaluation

The methods of the present disclosure provide rules that were found to be about one-hundred times more compact than rules learnt on (entity ID, trap ID) based approach, while achieving higher precision and recall, while further reducing training time. The data below illustrates these facts.

As can be seen from Table 1, below, for both real and synthetic datasets, the number of signatures is greatly reduced with the methods of the present disclosure as compared to an (entity ID, trap TD) based approach, thus creating more compact rules. Further, the training time is reduced according to the methods of the present disclosure.

TABLE 1

| Dataset | # signatures (present disclosure) | # signatures (entity ID, trap ID) based approach | Training time (min) (present disclosure) | Training time (min) (entity ID, trap ID) based approach |
|---------|-----------------------------------|--------------------------------------------------|------------------------------------------|---------------------------------------------------------|
| Real | 44 | 4,518 | 3 | 10 |
| Synthetic | 92 | 12,645 | 6 | 21 |

As can be seen from Table 2, below, for both real and synthetic datasets, the precision is increased with the methods of the present disclosure as compared to an (entity TD, trap TD) based approach. Further, the recall is improved according to the methods of the present disclosure as compared to the (entity TD, trap TD) based approach.

TABLE 2

| Dataset | Precision (based on present disclosure) | Precision (entity ID, trap ID) based approach | Recall (invention) | Recall (entity ID, trap ID) based approach |
|---------|-----------------------------------------|-----------------------------------------------|--------------------|--------------------------------------------|
| Real | 0.92 | 0.82 | 0.91 | 083 |
| Synthetic | 0.88 | 0.68 | 0.87 | 0.70 |

Example Process

Figure 2:
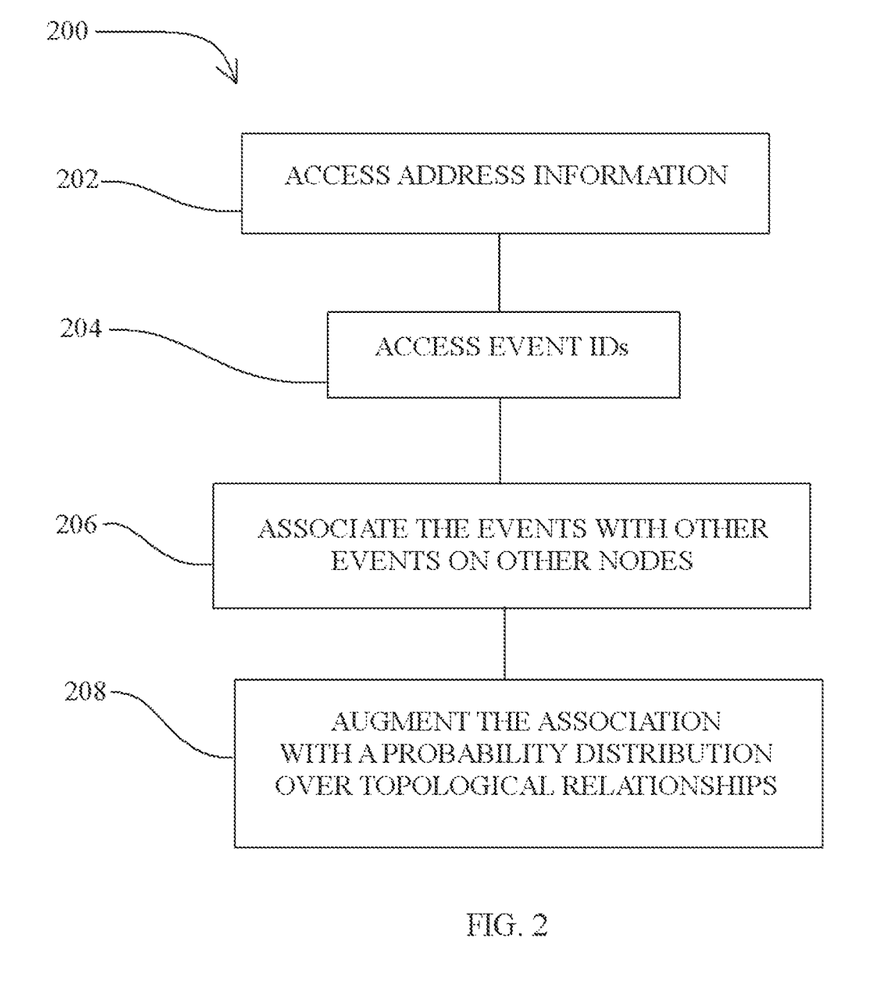
FIG. 2 is a flow chart describing a method for determining a correlation of one or more events occurring in a plurality of network nodes of a network, according to an illustrative embodiment.

It may be helpful now to consider a high-level discussion of an example process. To that end, FIG. 2 presents an illustrative process 200 related to the methods for determining a correlation of events in network nodes. Process 200 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 2, at block 202 of process 200, the computing device accesses a plurality of address information associated with a plurality of nodes on network, such as a telco network. At block 204, the computing device accesses one or more event IDs associated with one or more events occurring on one or more of the plurality of nodes. At block 206, the computing device can associate one or more events occurring on the one or more plurality of nodes with similar events occurring on others of the one or more plurality of nodes, the association including address information. The address information can be used to establish a topological relationship between the nodes. A block 208 can augment the associations (rules) with probability distributions over the topological relationships between event pairs.

Example Computing Platform

Figure 3:
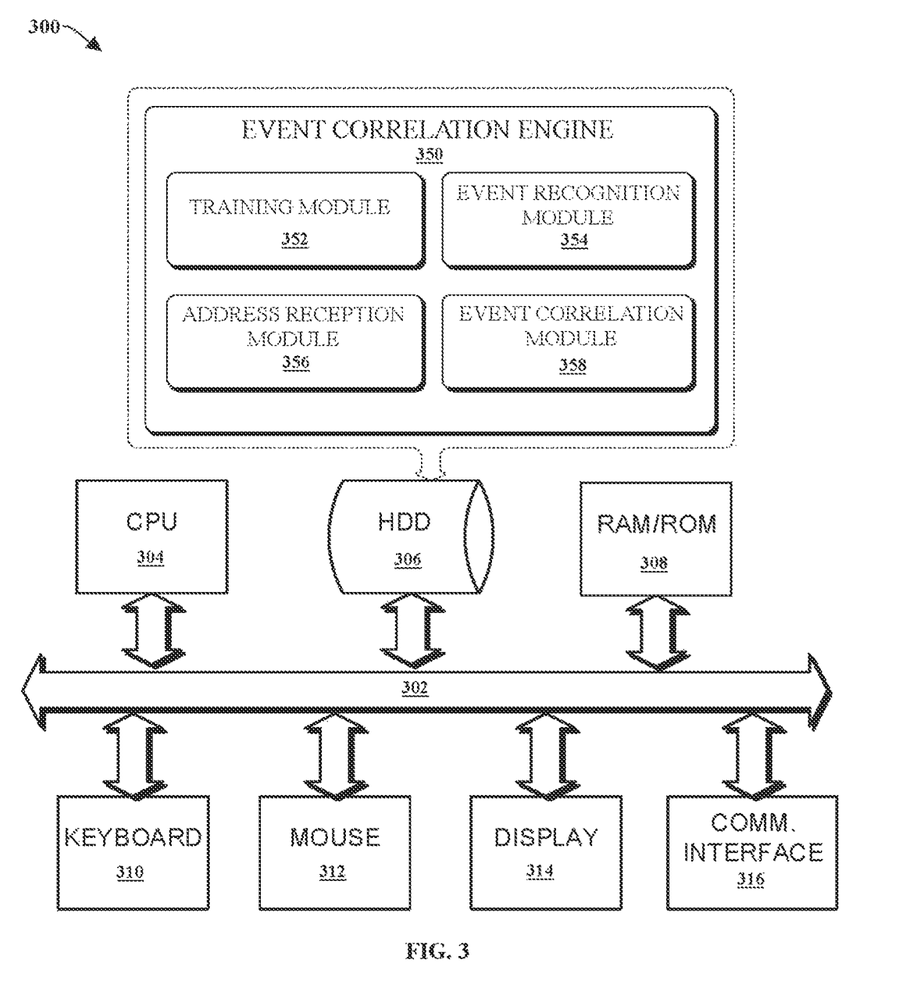
FIG. 3 is a functional block diagram illustration of a computer hardware platform that can be used to implement the method for determining a correlation of one or more events occurring in a plurality of network nodes of a network, according to an illustrative embodiment.

FIG. 3 provides a functional block diagram illustration of a computer hardware platform 300 that can be used to implement a particularly configured computing device that can host an event correlation engine 350 for determining a correlation of events in network nodes. The event correlation engine 350 can include a training module 352 for training the event correlation engine 350, an event reception module 354, for receiving events from one or more of the network nodes, an address reception module 356, for receiving addresses from the one or more network nodes reporting the events, and an event correlation module 358, for correlating the events with the nodes and generating a topological relationship within this correlation.

The computer platform 300 may include a central processing unit (CPU) 304, a hard disk drive (HDD) 306, random access memory (RAM) and/or read only memory (ROM) 308, a keyboard 310, a mouse 312, a display 314, and a communication interface 316, which are connected to a system bus 340. In one embodiment, the event correlation engine 350 has capabilities that include performing the method 200 described above with respect to FIG. 2.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A method for determining a correlation of one or more events occurring in a plurality of nodes of a network, comprising:
   accessing, by a computing device, address information associated with each of the plurality of nodes on the network;
   accessing, by the computing device, one or more event IDs associated with one or more events occurring on the plurality of nodes;
   creating an association, by the computing device, between the one or more events occurring on the plurality of nodes with related events occurring on others of the plurality of nodes, the association including the address information;
   computing a topology homogeneity score on the one or more event IDs, based on a topological relationship between the plurality of nodes;
   identifying rules of a node of the plurality of nodes to be transferrable to another node of the plurality of nodes based on the topology homogeneity score; and
   reducing a number of false positives in an alert based on the rules.

2. The method of claim 1, wherein the network is a telecommunications network.

3. The method of claim 2, wherein the events are artificial intelligence operation events.

4. The method of claim 1, further comprising training the computing device with training data to establish a correlation between the events and the plurality of nodes as well as the topological relationship between the nodes.

5. The method of claim 4, further comprising calculating a probability distribution of the correlation between the events and the plurality of nodes between each of the topological relationships.

6. The method of claim 4, further comprising determining an entropy of the probability distribution and flagging the correlations that have an entropy above a predetermined threshold as being spurious.

7. The method of claim 1, further comprising capturing the topological relationship between the plurality of nodes.

8. The method of claim 7, wherein the topological relationship includes one of border gateway protocol peers, open shortest path first neighbors, virtual private network tunnel, or shared virtual extensible local area network.

9. The method of claim 7, further comprising calculating a log likelihood score of the correlation between the events and the plurality of nodes between each of the topological relationships.

10. The method of claim 9, further comprising flagging the correlations that have the log likelihood score below a predetermined threshold as being spurious.

11. A method for determining a correlation of one or more events, in a telecommunication artificial intelligence operation, occurring in a plurality of network nodes of a network, comprising:
    accessing, by a computing device, address information associated with each of the plurality of nodes on the network;
    accessing, by the computing device, one or more event IDs associated with one or more events occurring on the plurality of nodes;
    creating an association, by the computing device, between the one or more events occurring on the plurality of nodes with related events occurring on others of the plurality of nodes, the association including the address information;
    capturing a topological relationship between the plurality of nodes;
    calculating a log likelihood score of the correlation between the events and the plurality of nodes between each of the topological relationships;
    identifying rules of a node of the plurality of nodes to be transferrable to another node of the plurality of nodes based on the association including the address information; and
    reducing a number of false positives based on the rules.

12. The method of claim 11, further comprising flagging the correlations that have the log likelihood score below a predetermined minimum as being spurious.

13. The method of claim 11, further comprising training the computing device with training data to establish a correlation between the events and the plurality of nodes as well as a topological relationship between the nodes.

14. The method of claim 13, further comprising calculating a probability distribution of the correlation between the events and the plurality of nodes between each of the topological relationships.

15. The method of claim 13, further comprising determining an entropy of the probability distribution and flagging the correlations that have an entropy above a predetermined threshold as being spurious.

16. A non-transitory computer readable storage medium tangibly embodying a computer readable program code having computer readable instructions that, when executed, causes a computer device to carry out a method for determining a correlation of one or more events occurring in a plurality of network nodes of a network, the method comprising:
    accessing, by a computing device, address information associated with each of the plurality of nodes on the network;
    accessing, by the computing device, one or more event IDs associated with one or more events occurring on the plurality of nodes;
    creating an association, by the computing device, the one or more events occurring on the plurality of nodes with related events occurring on others of the plurality of nodes, the association including the address information;
    computing a topology homogeneity score on the event IDs, based on a topological relationship between the plurality of nodes;
    identifying rules of a node of the plurality of nodes to be transferrable to another node of the plurality of nodes based on the topology homogeneity score; and
    reducing a number of false positives based on the rules.

17. The non-transitory computer readable storage medium of claim 16, the method further comprising:
    capturing the topological relationship between the plurality of nodes; and
    calculating a log likelihood score of the correlation between the events and the plurality of nodes between each of the topological relationships.

18. The non-transitory computer readable storage medium of claim 17, the method further comprising flagging the correlations that have the log likelihood score below a predetermined minimum as being spurious.

19. The non-transitory computer readable storage medium of claim 18, the method further comprising:
    training the computing device with training data to establish a correlation between the events and the plurality of nodes as well as a topological relationship between the nodes; and
    calculating a probability distribution of the correlation between the events and the plurality of nodes between each of the topological relationships.

20. The non-transitory computer readable storage medium of claim 19, the method further comprising:
    determining an entropy of the probability distribution and flagging the correlations that have an entropy above a predetermined threshold as being spurious.

* * * * *